United States Patent
Boyd et al.

(10) Patent No.: US 7,299,459 B1
(45) Date of Patent: Nov. 20, 2007

(54) PARSER FOR SIGNOMIAL AND GEOMETRIC PROGRAMS

(75) Inventors: Stephen Boyd, Stanford, CA (US); Xiling Shen, Stanford, CA (US); Mar Hershenson, Palo Alto, CA (US); Lieven Vandenberghe, Santa Monica, CA (US); Cesar Crusius, Palo Alto, CA (US); Dave Colleran, San Mateo, CA (US); Sunderarjan Mohan, Mountain View, CA (US)

(73) Assignee: Sabio Labs, Inc., Mountain View, CA (US)

( * ) Notice: Subject to any disclaimer, the term of this patent is extended or adjusted under 35 U.S.C. 154(b) by 425 days.

(21) Appl. No.: 09/752,541

(22) Filed: Dec. 29, 2000

Related U.S. Application Data

(60) Provisional application No. 60/177,021, filed on Jan. 19, 2000.

(51) Int. Cl.
G06F 9/45 (2006.01)
G06F 7/60 (2006.01)
(52) U.S. Cl. .......................... 717/137; 703/2
(58) Field of Classification Search ............... 717/112, 717/137–145, 151, 154, 156; 716/1, 16, 716/18–19, 2; 703/2, 13
See application file for complete search history.

(56) References Cited

U.S. PATENT DOCUMENTS

| | | |
|---|---|---|
| 4,827,428 A | 5/1989 | Dunlop et al. |
| 5,055,716 A | 10/1991 | El Gamel |
| 5,289,021 A | 2/1994 | El Gamel |
| 5,402,358 A | 3/1995 | Smith et al. |

(Continued)

FOREIGN PATENT DOCUMENTS

GB         2 131 228 A      6/1984

OTHER PUBLICATIONS

Rajgopal et al., "Robustness of Posynomial Geometric Programming Optima", Mathematical Programming, vol. 85, pp. 423-431, 1999.*

(Continued)

*Primary Examiner*—Tuan A Vu
(74) *Attorney, Agent, or Firm*—Blakely Sokoloff Taylor & Zafman LLP

(57) ABSTRACT

A method and apparatus for parsing signomial and geometric programs, referred to herein as "the Parser". Signomial and Geometric programming is a unique class of mathematical problems that is useful in the study of optimization problems. The Parser is a program designed to recognize and parse both signomial and geometric programs such that they may be accepted and solved by signomial and geometric program solvers. The Parser accepts an optimization problem from a user in the form of algebraic expressions. The Parser can then identify the problem as a signomial program and can further determine if it reduces to a geometric program. If either a signomial or geometric program exists, the Parser converts the algebraic expressions to a compact numeric format that can be accepted by a computer-aided solver. In the case of a geometric program, the solver may find a global solution to the optimization problem. However, in the case of signomial program, the solver may only find a local solution. The solution found by the solver is routed back to the Parser which reports it in a user-readable format.

19 Claims, 4 Drawing Sheets

U.S. PATENT DOCUMENTS

| | | | |
|---|---|---|---|
| 5,633,807 | A | 5/1997 | Fishburn et al. |
| 5,754,826 | A | 5/1998 | Gamal et al. |
| 5,973,524 | A | 10/1999 | Martin |
| 6,002,860 | A | 12/1999 | Voinigescu et al. |
| 6,269,277 | B1 | 7/2001 | Hershenson |
| 6,311,145 | B1 * | 10/2001 | Hershenson et al. ........... 703/2 |
| 6,311,315 | B1 | 10/2001 | Tamaki |
| 6,321,367 | B1 | 11/2001 | Chun et al. |
| 6,381,563 | B1 | 4/2002 | O'Riordan et al. |
| 6,425,111 | B1 | 7/2002 | del Mar Hershenson |
| 6,532,569 | B1 | 3/2003 | Christen et al. |
| 6,577,992 | B1 | 6/2003 | Tcherniaev et al. |
| 6,581,188 | B1 | 6/2003 | Hosomi et al. |

OTHER PUBLICATIONS

Rajgopal, "posy.for", directory /dept/ie/GP at ftp.pitt.edu; Jul. 22, 1996.*

Rajgopal, "gpposy.for", directory /dept/ie/GP at ftp.pitt.edu; Jul. 22, 1996.*

Dennis Bricker, "Signomial Geometric Programming", University of Iowa, <http://css.engineering.uiowa.edu/~dbricker/Stacks_pdf8/Signomial_GP.pdf>, Apr. 1999.*

AMPL: A Modeling Language for Mathematic Programming, Robert Fourer, David M. Gay, and Brian W. Kernighan, Boyd & Fraser Publishing Company, 1993 (351 pgs.).

GAMS, A User's Guide, by: Anthony Brooke, David Kendrick, Alexander Meeraus, Ramesh Raman, Tutorial by: Richard E. Rosenthal, Dec. '98, GAMS Development Corporation, 1998 (262 pgs.).

Chapter 4, *Conveying Problem Structure from an Algebraic Modeling Language to Optimization Algorithyms*, Robert Fourer and David M. Gay, Northwestern Universit and; Bell Laboratories, (pg. 77-89); Computing Tools for Modeling, Optimization and Simulation: *Interfaces in Computer Science and Operations Research*, edited by Manuel Laguna, University of Colorado, Jose Luis Gonzalez Velarde, ITESM Campus Monterrey.

*An Infeasible Interior-point Algorithm for Solving Primal and Dual Geometric Programs*, K.O. Kortanek, Xiaojie Xu, Yinyu Ye, Mathematic Programming, A Publication of the Mathematic Programming Society, Series B, Interior Point Methods in Theory and Practice, edited by Kurt Anstreicher, vol. 76 (1997) No. 1-2 Jan. 1997 (pp. 155-181).

Chapter 4, *sdpsol: A Parser/Solver for Semidefinite Programs with Matrix Structure*, Shao-Po Wu and Stephen Boyd (pp. 79-91).

Mediero, F., et al., "A Vertically Integrated Tool For Automated Design Of Sigma Delta Modulators", IEEE Journal of Solid-State Circuits, vol. 30., No. 7, Jul. 1, 1995, pp. 762-767.

Von Kaenel, V., et al., "A 320MHz, 1.5mW at 1.36V CMOS PLL For Microprocessor Clock Generation", IEEE Solid-State Circuits Conference, Nov. 9, 1996, Digest of Technical Papers, 42nd ISSCC96/ Session 8 / Digital Clock and Latches /Paper FA 8.2.

Chan, et al., "Analysis of Linear Networks and Systems," Addison-Wesley Publishing Company, 1972, pp. 23-25 and 46-57.

Young, et al., "A PLL Clock Generator with 5 to 110 MHz of Lock Range for Microprocessor", IEEE Journal of Solid-State Circuits, vol. 27, No. 11, Nov. 1992, pp. 1599-1607.

NOVOF, et al., "Full Integrated CMOS Phase-Locked Loop with 15 to 240 MHz Locking Range and ±50 ps Jitter", IEEE Journal of Solid-State Circuits, vol. 30., No. 11, Nov. 1995, pp. 1259-1266.

Mohan, et al., "Simple Accurate Expressions for Planar Spiral Inductances", IEEE Journal of Solid-State Circuits, vol. 34, No. 10, Oct. 1999, pp. 1419-1424.

Hershenson, "CMOS Analog Circuit Design Via Geometric Programming", A Dissertation Submitted to the Department of Electrical Engineering and the Committee on Graduate Studies of Stanford University, Nov. 1999, 241 pages.

Hershenson, M., et al., "Optimization of Inductor Circuits via Geometric Programming", pp. 994-998, Design Automation Conference, Jun. 21, 1999, Proceedings.

Hershenson, M., et al., "Automated Design of Folded-Cascode Op-Amps with Sensitivity Analysis", pp. 121-124, Electronics, Circuits and Systems, IEEE International Conference on LISBOA, Sep. 7-10, 1998.

Gielen, G., et al., "An Analogue Module Generator For Mixed Analogue/Digital ASIC Design", International Journal of Circuit Theory and Applications, vol. 23, pp. 269-283, 1995.

Kortanek, K.O., et al., "An Infeasible Interior-Point Algorithm For Solving Primal And Dual Geometric Programs," pp., 155-181, Mathematical Programming Society, Inc., 76:155-181, Jan. 1, 1995.

Hershenson, M., et al., "GPCAD: A Tool for CMOS Op-Amp Synthesis" 8 pages, Proceedings of the IEEE/ACM International Conference on Computer Aided Design (ICCAD), pp. 296-303, Nov. 1998.

Hershenson, M., et al., "Posynomial models for MOSFETs" 9 pages, Jul. 7, 1998.

Chang, H, et al., "A Top-Down, Constraint-Driven Design Methodology for Analog Integrated Circuits" 6 pages, IEEE 1992 Custom Integrated Circuits Conference.

Chavez, J., et al, "Analog Design Optimization: A Case Study" 3 pages, IEEE, Jan. 1993.

Geilen, G., et al., "Analog Circuit Design Optimization Based on Symbolic Simulation and Simulated Annealing", pp. 707-713, IEEE Journal of Solid-State Circuits, vol. 25, No. 3, Jun. 1990.

Fishburn, J, et al., "TILOS: A Posynomial Programming Approach to Transistor Sizing" pp. 326-328, IEEE, 1985.

Maulik, P., et al., "Integer Programming Based on Topology Selection of Cell-Level Analog Circuits", 12 pages, IEEE Transactions On Computer-Aided Design Of Integrated Circuits And Systems, vol. 14, No. 4, Apr. 1995.

Swings, K., et al., "An Intelligent Analog IC Design System Based On Manipulation Of Design Equations" pp. 8.6.1-8.6.4, IEEE 1990, Custom Integrated Circuits Conference.

Nesterov, Y., et al., "Interior-Point Polynomial algorithms in Convex Programming" 8 pgs., 1994, Society for Industrial and Applied mathematics.

Yang, H.Z., et al., "Simulated Annealing Algorithm with Multi-Molecule: an Approach to Analog Synthesis" pp. 571-575, IEEE, 1996.

Wong, D.F., et al., "Simulated Annealing For VLSI Design" 6 pages, 1998, Kulwer Academic Publishers.

Maulik, P., et al., "Sizing of Cell-Level Analog Circuits Using Constrained Optimization Techniques" pp. 233-241, IEEE Journal of Solid-State Circuits, vol. 28, No. 3, Mar. 1993.

Ochotta, E, et al., "Synthesis of High -Performance Analog Circuits in ASTRX/OBLS" pp. 273-295, IEEE Transactions on Computer-Aided Design of Integrated Circuits And Systems, vol. 15, No. 3, Mar. 1996.

Wright, S., "Primal-Dual Interior-Point Methods" pp. 1-3, http://www.siam.org/books/wright, Printed Aug. 19, 1998.

Shyu, J., et al., "Optimization-Based Transistor Sizing" pp. 400-408, IEEE Journal of Solid-State Circuits, vol. 23, No. 2, Apr. 1998.

Wright, S., "Primal-Dual Interior-Point Methods" 14 pages, 1997, Society for Industrial and Applied Mathematics.

Van Laarhoven, P.J.M., et al., "Simulated Annealing: Theory and Applications" 26 pages, 1987, Kulwer Academic Publishers.

Hershenson, M., et al., "CMOS Operational Amplifier Design and Optimization via Geometric Programming" pp. 1-4, Analog Integrated Circuits, Stanford University.

Aguirre, M.A., et al., "Analog Design Optimization by means of a Tabu Search Approach" pp. 375-378.

Medeiro, F., et al., "A Statistical Optimization-Based Approach for Automated Sizing of Analog Cells", pp. 594-597, Dept. of Analog Circuit Design.

Spatnekar, S., "Wire Sizing as a Convex Optimization Problem: Exploring the Area-Delay Tradeoff" 27 pages, Dept. of Electrical and Computer Engineering.

Su, H., et al., "Statistical Constrained Optimization of Analog MOS Circuits Using Empirical Performance Models" pp. 133-136.

Vassiliou, I., et al, "A Video Driver System Designed Using a Top-Down, Constraint-Driven Methodology" 6 pages.

Sapatnekar, S, et al., "An Exact Solution to the Transistor Sizing Problem for CMOS Circuits Using Convex Optimization" 35 pages.

Bowman, R., "An Imaging Model For Analog Macrocell Layout Generation", IEEE International Symposium On Circuits And Systems, vol. 2, May 1989, pp. 1127-1130, XP010085007.

Hunter, A., et al., "Combining Advanced Process Technology and Design for Systems Level Integration", IEEE Proceedings, pp. 245-250, First International Symposium On Quality Electronic Design, Mar. 20, 2000.

Gielen, G., et al. "An Analogue Module Generator For Mixed Analogue/Digital ASIC Design", International Journal of Circuit Theory and Applications, vol. 23, pp. 269-283, 1995.

Vandenberghe, L. et al., "Semidefinite Programming", www.stanford.edu/~boyd/reports/semidef_prog.pdf, 50 pgs. Siam Review, Mar. 1996.

* cited by examiner

PARSER FOR SIGNOMIAL AND GEOMETRIC PROGRAMS

Priority is claimed to Provisional Application Ser. No. 60/177,021, filed Jan. 19, 2000.

FIELD OF THE INVENTION

The invention relates to the field of mathematical optimization, particularly the recognition and parsing of signomial and geometric programs such that they may be accepted and solved by signomial and geometric program solvers.

BACKGROUND AND PRIOR ART

Geometric programming is a unique class of mathematical problems that is useful in the study of optimization problems. The theory of Geometric Programming was initially developed over three decades ago and culminated in a publication by R. J. Duffin, E. L. Peterson and C. M. Zener (Geometric Programming, John Wiley & Sons, 1967). This publication describes a Geometric Program (GP) as an optimization problem having an objective function and a set of constraints which all must meet certain mathematical criteria. Perhaps the most important property of GPs is that they can be solved, with great efficiently, and globally, using recently developed interior-point methods.

Since the impact of GPs can be seen in fields of engineering design, manufacturing, economics, statistics, and chemical equilibrium, it is apparent that the ability to solve GPs can have many benefits. A very simple GP can be solved by hand, but more complex GPs effectively must be solved with the aid of computer programs. For example, a very complex GP that may be used to describe a circuit design problem may have hundreds of optimization variables and thousands of constraints. The mathematical operations needed to solve a GP of this magnitude would be too cumbersome to perform by hand; therefore, optimization programs are needed to solve most GPs.

Several optimization programs have been written that can solve GPs. For example, two popular GP solvers are MOSEK™ (product of EKA Consulting Aps, Vissenbjerg, Denmark) and COPL_GP (developed by members of the Computational Optimization Laboratory, Department of Management Science, University of Iowa). However, these programs require that GPs be parsed and represented in a particular compact numeric format that can be read and, if possible, globally solved by a solver program. Parsing a GP into this particular format typically requires extensive labor by one or more people. Moreover, if this compact numeric format were generated by hand, any changes to the functions, variables or coefficients contained in the GP would require extensive labor to modify the problem. Thus, it would be advantageous to have a parser program that can automatically convert a geometric program to this compact numeric format.

Software tools exist that will parse and solve a wide variety of optimization problems. Two well known examples of such tools are the software packages AMPL™ (product of the Bell Laboratories Division of Lucent Technologies Inc., Murray Hill, N.J.) and GAMS™ (product of the GAMS Development Corporation, Washington, D.C.) which incorporate a variety of backend solvers. These packages allow a user to input one of a variety of optimization problems, in a standard algebraic format, and then will parse the problem into a format that is readable by a solver. However, these programs are very general in function and lack the sophistication required to identify and/or parse a GP. Some parsers have been developed to specifically parse specific classes of optimization problems. For example, a program called SDP-SOL (developed by Dr. Stephen Boyd and members of his group at the Information Systems Laboratory, Department of Electrical Engineering, Stanford University) is a parser/solver program specifically designed for semidefinite programming. Similarly, there is a need for a parser program that can identify and parse a GP because current optimization software tools lack the ability to accomplish these tasks.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

Figure 1:
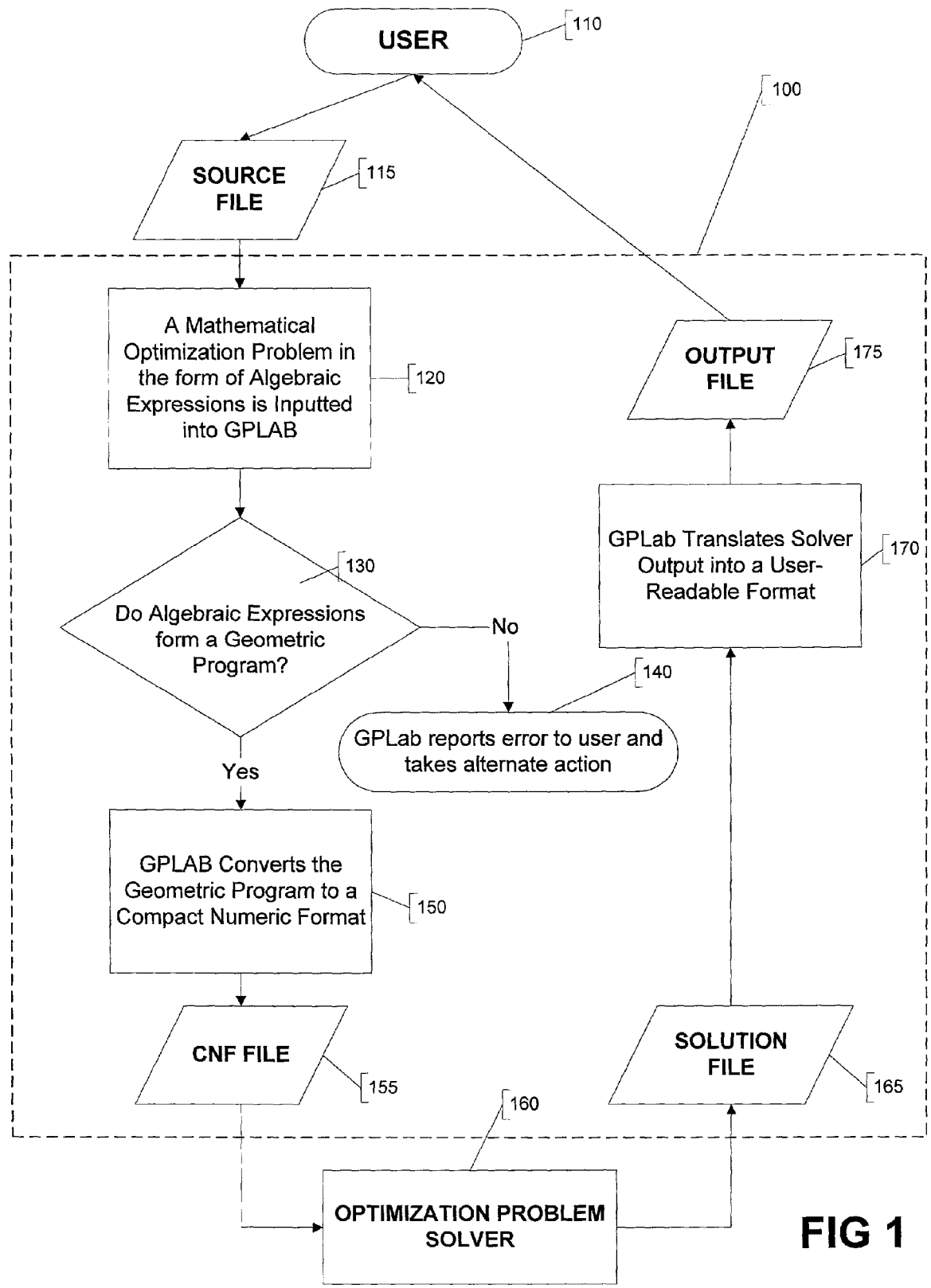
FIG. 1 is a flow diagram showing the operations performed by certain exemplary embodiments of the invention.

In the following description, numerous specific details are set forth to provide a thorough understanding of the invention. However, it is understood that the invention may be practiced without these specific details. In other instances, well-known mathematical concepts, structures and techniques have not been shown in detail in order not to obscure the invention.

Background on Geometric Programming

In order to better understand the scope of the invention, it is important to introduce some mathematical terminology associated with geometric programming. For example, monomials, posynomials, and signomials are three types of mathematical functions found in geometric programs. These functions are defined below, beginning with a monomial.

Let $x_1, \ldots, x_n$ denote n real positive variables. A function $f: R^n \to R$ of the form $$f(x) = cx_1^{a_1} \ldots x_n^{a_n},$$

where $c>0$ and $a_1 \in R$, is called a monomial function. Note that exponents can be any real numbers, including fractional or negative. We can refer to a monomial function more informally as just a monomial (of the variables $x_1, \ldots, x_n$). We refer to the constant c as the coefficient of the monomial. As an example, $2.3 x_1^2 x_2^{-0.15}$ is a monomial of the variables $x_1$ and $x_2$, with coefficient 2.3 and $x_2$-exponent $-0.15$.

Any positive constant is a monomial, as is any variable. Monomials are closed under multiplication and division: if $f$ and $g$ are both monomials then so are $f \times g$ and $f/g$. (This includes scaling by any positive constant.) A monomial raised to any power is also a monomial:

$$f(x)^\gamma = (cx_1^{a_1} x_2^{a_2} \ldots x_n^{a_n})^\gamma = c^\gamma x_1^{\gamma a_1} x_2^{\gamma a_2} \ldots x_n^{\gamma a_n}.$$

In addition, a sum of zero or more monomials, i.e., a function of the form $$f(x) = \sum_{k=1}^{K} c_k x_1^{a_{1k}} x_2^{a_{2k}} \ldots x_n^{a_{nk}},$$

where $c_j \geq 0$, is called a posynomial function or, more simply, aposynomial (with K terms).

Any monomial is also a posynomial. Posynomials are closed under addition, multiplication, and nonnegative scaling. Posynomials can be divided by monomials (with the result also a posynomial): If $f$ is a posynomial and g is a monomial, then $f/g$ is a posynomial. If $\gamma$ is a nonnegative integer and $f$ is a posynomial, then $f$ always makes sense and is a posynomial (since it is the product of $\gamma$ posynomials).

A generalization of a posynomial will also be encountered, in which the coefficients are allowed to be negative. A signomial is a function with the same form as a posynomial, as defined above, where the coefficients $c_j$ are allowed to be negative. Signomials include as special cases posynomials (and therefore also monomials) and (positive or negative) constants. Signomials are closed under addition, subtraction, and multiplication. A signomial can be divided by a signomial that is nonzero and has only one term (i.e., a monomial, or the negative of a monomial). A signomial raised to any nonnegative integer power is also a signomial.

Any signomial can be expressed as the difference of two posynomials, by collecting together the terms with positive coefficients, and also the terms with negative coefficients. We will use the notation $f_+$ to denote the posynomial part of the signomial $f_-$ and $f$ to denote the negative posynomial part of $f$, so $f=f_+-f_-$ where $f_+$ and $f_-$ are both posynomials.

The following are some examples of monomials, posynomials and signomials. Suppose x, y, and z are (positive) variables. The functions 2x, 0.23, 2z√x/y, 3x²y⁻¹·²z are monomials (hence, also posynomials and signomials). The functions 0, 0.23+ x/y, 2(1+xy)³, 2x+3y+2z are posynomials (hence, also signomials) but not monomials. The functions −2.2, −x/y, 2(1−xy)³, 2x+3y−2z are signomials but not posynomials. Finally, the functions (x+y)⁻¹, 2(1+xy)³·¹, 1+log z are not signomials.

Monomials, posynomials, and signomials are all functions that can be found in a geometric program ("GP"). A standard form GP is an optimization problem of the form show in Equation Set 1.

$$\begin{aligned}
\text{minimize} \quad & f_0(x) \qquad\qquad \text{Equation Set 1}\\
\text{subject to} \quad & f_i(x)\ 1, \quad i=1,\ldots,m,\\
& h_i(x) = 1, \quad i=1,\ldots,p
\end{aligned}$$

In Equation Set 1 $f_i$ are posynomial functions, $h_i$ are monomials, and $x_i$ are the optimization variables. (There is an implicit constraint that the variables are positive, i.e., $x_i>0$). In a GP in standard form the objective $f_0$ must be posynomial and it must be minimized; in addition, the equality constraints can only have the form of a monomial equal to one, and the inequality constraints can only have the form of a posynomial less than or equal to one. A solution to a GP is found when a minimum or maximum value of the objective is calculated from values of the optimization variables meeting the conditions set by the constraints. What makes the use of GPs powerful is that they can be solved globally, with great efficiency.

A generalization of a geometric program is a signomial program ("SGP"), which has the form shown in Equation Set 2.

$$\begin{aligned}
\text{minimize} \quad & f(x) \qquad\qquad \text{Equation Set 2}\\
\text{subject to} \quad & a_i(x)\ b_i(x), \quad i=1,\ldots,m,\\
& c_i(x) = d_i(x), \quad i=1,\ldots,p
\end{aligned}$$

In Equation Set 2 $a_i$, $b_i$ and $d_i$ are all signomial functions, and $x_i$ are the optimization variables. (As in GP, there is an implicit constraint that the variables are positive, i.e., $x_i>0$.) It is also required that the objective $f$ be a posynomial.

Note the differences between the standard form GP (Equation Set 1) and the SGP (Equation Set 2):

In an SGP, the constraint functions can be arbitrary signomials; in a GP they must be posynomials and monomials, respectively.

In an SGP, the righthand side of the inequalities and equalities can also be signomials; in a GP, the righthand side of the inequalities and equalities is one.

From a computational point of view, there is a significant difference between a GP and an SGP. While the globally optimal solution of a GP can always be found efficiently (e.g., an absolute maximum, only a locally optimal solution of an SGP can be computed efficiently. Although it is possible to compute the globally optimal solution of an SGP, this can require prohibitive computation, even for relatively small problems.

Furthermore, it can be seen that a standard form GP with posynomial objective function $f_0$, posynomial constraint functions $f_1, \ldots, f_m$, and monomial equality functions $g_1, \ldots, g_p$, is already in SGP form, with $b_i=c_i=1$ (which are signomials). Thus any standard form GP is also an SGP.

For several purposes of the invention it is convenient to transform a SGP into a special form in which the left and right-hand sides of each constraint are posynomials. This can be done by first expressing the inequality $a_i \leq b_i$ in Equation Set 2 as $a_1-b_i \leq 0$, and then splitting it into its posynomial and negative posynomial parts, and expressing it as $(a_i-b_i)_+ \leq (a_i-b_1)_-$. The same can be done to each equality constraint, and examples of splitting a signomial into its posynomial and negative posynomial are shown in Examples 1 and 2.

Example 1

$$(2x+3y-2z)_+ = 2x+3y, \quad (2x+3y-2z)_- = 2z$$

Example 2

$$(2(1-xy)^3)_+ = 2+6x^2y^2, \quad (2(1-xy)^3)_- = 6xy+2x^3y^3$$

Ultimately, the SGP in Equation Set 2 can be rewritten as shown in Equation Set 3 below.

$$\begin{aligned}
\text{minimize} \quad & f(x) \quad & \text{Equation Set 3}\\
\text{subject to} \quad & (a_i(x) - b_i(x))_+ (a_i(x) - b_i(x))_- \\
& i = 1, \ldots, m \\
& (c_i(x) - d_i(x))_+ = (c_i(x) - d_i(x))_- \\
& i = 1, \ldots, p
\end{aligned}$$

In this form of the SGP the objective and each of the left and right-hand sides of each constraint is a posynomial function. For this reason we refer to the program in Equation Set 3 as the posynomial form of the SGP.

One Embodiment of the Invention

FIG. 1 illustrates the operations that are performed by certain exemplary embodiments of the invention, hereinafter "the Parser," in order to parse an optimization problem such as a signomial or geometric program. These operations are contained in box 100. First a user 110 must input a source file 115 that describes an optimization problem (e.g., an SGP), as shown in block 120. This process of inputting source file 115 can occur via a user interface which may include a computer operating system, a web browser, or other user-computer interfaces. Each line of source file 115 will include one of the following: 1) an optimization variable declaration, 2) an internal variable assignment or 3) an algebraic expression. In addition, the algebraic expressions contained in the source file will collectively comprise: 1) an objective function, 2) one or more equality constraints and 3) one or more inequality constraints.

A very simple example of an optimization program, in this case a SGP, is shown in Equation Set 4:

$$\begin{aligned}
\text{minimize} \quad & x_1 x_3 + x_1 x_2 / x_3 \quad & \text{Equation Set 4}\\
\text{subject to} \quad & x_1 x_3^{-0.3} + 1 \; x_3 - x_1 x_2 / x_3 x_2^{1.2}, \\
& x_3 \; 30, \\
& x_1 - 4.1/x_2 x_3 = 0,
\end{aligned}$$

This problem can be specified in the Parser language as shown in Equation Set 5:

Equation Set 5 variable x1, x2, x3;

minimize x1*x3+x1*x2/x3;

x1*2^-0.3+1<x3-x2^1.2;

x2<30;

x1-4.1 sqrt (x2/x3)=0;

There is a very close similarity between this the Parser source file (i.e., Equation Set 5) and the mathematical description shown in Equation Set 4. In the first line, x1, x2 and x3 are declared to be optimization variables, and in the second line the objective is defined by an algebraic expression that includes a set of mathematical terms. For the purposes of the invention an algebraic expression is defined as a set of one or more variables and, in most problems, constants joined together by mathematical operators and functions including by not limited to addition, subtraction, multiplication and division. In addition, a mathematical term is defined as a subset of an algebraic expression that can independently form a mathematical function. Lines three and four of Equation Set 5 specify inequality constraints, and the last line specifies an equality constraint. Constraints are also defined by algebraic expressions which each include a set of mathematical terms.

At block 130 the Parser will determine if the algebraic expressions contained in the source file 115 form a GP. This provides the advantage of knowing that a global (e.g., an absolute minimum) solution to the optimization problem will be found as opposed to a local (e.g., a relative minimum) solution. Block 130 is illustrated in more detail in FIGS. 2A and 2B and will soon be discussed.

If block 130 is successful then at block 150 the Parser will continue to parse the GP by converting it from its algebraic format (e.g., Equation Set 5) to a compact numeric format ("CNF"), thus creating CNF file 175. Otherwise, if block 130 is unsuccessful then an error message will be reported to user 110, indicating the type of error and at which line of source file 115 the error occurred. Types of errors include but are not limited to syntax and mathematical infeasibility. It will be understood that errors may be immediately reported to user 110, or the Parser can wait until all the lines of source file 115 are read and report the total number of errors found and their locations in source file 115. If an error message is reported then user 110 may make corrections and re-execute the Parser program.

Alternatively, the Parser may report the error stating that the optimization problem cannot be reduced to a GP in standard form, but that it still meets the mathematical criteria of a SGP. In this case user 110 will have the option to successfully re-execute the Parser program in order to create CNF file 175 and have an external SGP solver attempt to find a local solution. However, it would be advantageous for user 110 to modify source file 115 such that the optimization problem may be reduced and parsed as a GP instead of SGP. This modification will provide a GP solver the opportunity to find a global solution to the optimization problem.

The conversion that occurs at block 150 is accomplished when the Parser successfully coverts a GP or SGP from its algebraic format to a CNF. The CNF is a format that is specific to the type of solver program that it is being using in conjunction with the Parser. The CNF is comprised of a set of matrices that represent the variables, coefficients, and exponents of the algebraic equations that form a GP or SPG. These matrices are created when the Parser converts each individual algebraic equation, as expressed in the GP or SGP, into a set of numeric values that represent the equations' optimization variables by their types, coefficients, and exponents. These numeric values are further arranged into a group of matrices that are stored in CNF file 175. These matrices are stored in such a manner that a solver program will be capable of reading CNF file 175 and recognizing a specific SGP or GP that it will attempt to solve.

Once CNF file 175 is created, the Parser will route it to solver 160. Solver 160 is capable of globally solving GPs and can process CNF file 175. For example, solvers MOSEK™ and COPL_GP are will know in the art and will accept CNF file 175 and are capable of solving both SGPs and GPs using interior point methods. All GP solvers require that a GP be inputted in a unique format; hence CNF file 175 produced by the Parser. Currently, without the aid of the Parser, this unique format file must be generated by hand. It can be appreciated that the Parser can automatically generate CNF file 175 as described earlier.

Figure 2A:
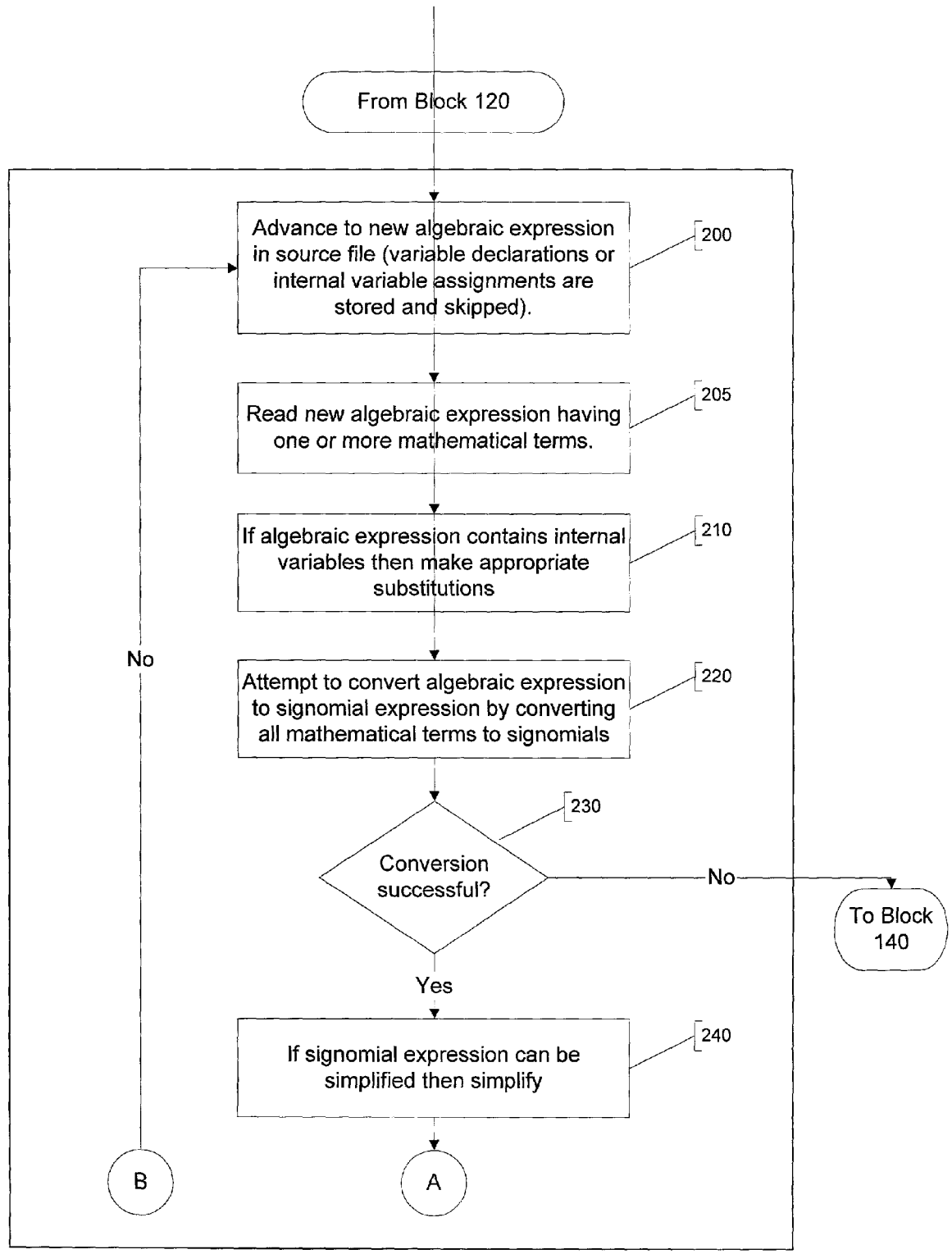
FIG. 2A is a first half of a flow diagram showing a more detailed look at the operations performed in block 130 of FIG. 1 according to one embodiment of the invention
Figure 2B:
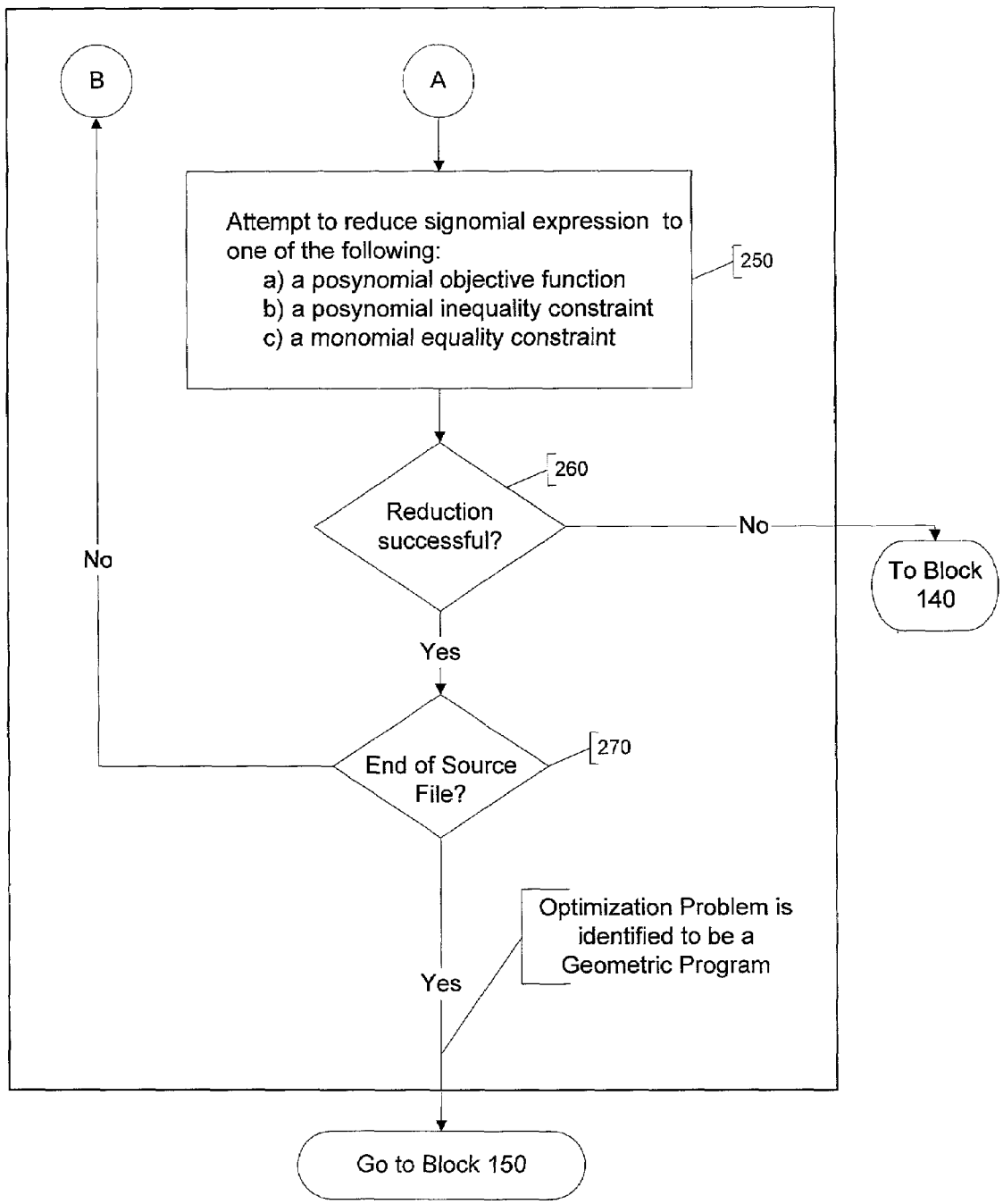
FIG. 2B is a second half of a flow diagram showing a more detailed look at the operations performed in block 130 of FIG. 1 according to one embodiment of the invention.

FIGS. 2A and 2B show a more detailed look at the operations included in block 130 of FIG. 1 according to one embodiment of the invention. From block 120 the Parser begins processing source file 115 to find the algebraic expressions, as shown is block 200. If a line contains a variable declaration, then the Parser stores the variables into memory, or if a line contains an internal variable assignment, then the Parser stores the internal variable and its assigned expression into memory. From block 200 the Parser will read a new algebraic expression at block 205. At block 210 the Parser recognizes, in the algebraic expression, any internal variables representing a previously assigned expression and, if necessary, makes one or more substitutions. The Parser will then advance to block 220 where it attempts to convert all the mathematical terms in the algebraic expression to signomial functions, thus creating a signomial expression. This conversion, if successful, allows for the performing of block 250 with great efficiency as described later.

If block 220 is successful, as determined by block 230, then the Parser will advance to block 240. Otherwise, if block 220 is unsuccessful then an error message will be reported to user 110, indicating the type of error and at which line of source file 115 the error occurred. Types of errors include but are not limited to syntax and mathematical infeasibility. It is understood that errors may be immediately reported to user 110, or the Parser can wait until all the lines of source file 115 are read and report the total number of errors found and their locations in the 115. If an error message is reported then user 110 may make corrections and re-execute the Parser program.

At block 240 the Parser will attempt to simplify the signomial expression created in block 220. For example, simplification can occur when a combination of two identical signomial functions of opposite signs are mathematically cancelled. The Parser will then advanced to block 250 where it will attempt to reduce the signomial expression to one of the following: 1) a posynomial objective, 2) a posynomial inequality, or 3) a monomial equality. Specifically, a posynomial inequality shall be a posynomial function being less than or equal to one, and a monomial equality shall be monomial function being equal to one. The fact that block 220 generated a signomial expression allows the Parser to apply a test that will determine if the reduction of the constraints in block 250 is successful.

Not all signomial constraints can be reduced to either a posynomial or monomial, but after block 220 it is straightforward to make this determination at block 250. At block 250 the Parser will first rewrite the signomial expression in its posynomial form. This process is shown in Equation Set 3 and can be applied to either an inequality or an equality, for example, $(a_i(x)-b_i(x))_+ (a_i(x)-b_i(x))_- i=1, \ldots, m,$ or $(c_i(x)-d_i(x))_+ = (c_i(x)-d_i(x))_- i=1, \ldots, p.$ The Parser will then determine if the right-hand side of the posynomial form constraint, i.e., $(a_i(x)-b_i(x))_-, i=1, \ldots, m$ or $(c_i(x)-d_i(x))_-, i=1, \ldots, m$ is a monomial. In addition, in the case of the equality the Parser will also determine if the left-hand side is a monomial. Ultimately, if block 250 is successful a constraint can be expressed as either $(a_1(x)-b_i(x))_+/(a_1(x)-b_1(x))_- 1 i=1, \ldots, m,$ or $(c_i(x)-d_i(x))_+/(c_1(x)-d_i(x))_- 1 i=1, \ldots, p.$ This notation reflects the notation shown in Equation Set 1, which represents a standard form GP. Therefore, with some abuse of notation, any SGP which can be transformed into a standard form GP in this way can be referred to as a geometric program.

As a simple example, consider the SGP:

| minimize | $x_i x_3 + x_i x_2/x_3$ |
| subject to | $x_i x_2^{-0.3} + 1\ x_3 - x_2^{1.2},$ |
| | $x_2 \leq 30,$ |
| | $x_1 - 4.1\ \sqrt{x_2/x_3} = 0,$ | which evidently is not a standard form GP. Therefore, the SGP is put in posynomial SGP form:

| minimize | $x_i x_3 + x_i x_2/x_3$ |
| subject to | $x_1 x_2^{-0.3} + 1 + x_2^{1.2} \leq x_3,$ |
| | $x_2\ 30,$ |
| | $x_1 = 4.1\ \sqrt{x_2/x_3}.$ |

Since each right-hand side is a monomial, we can transform the problem to a standard form GP by dividing by the right-hand sides:

| minimize | $x_1 x_3 + x_1 x_2/x_3$ |
| subject to | $x_1 x_2^{-0.3} x_3^{-1} + x_3^{-1} + x_2^{1.2} x_3^{-1} + x_2^{1.2} x_3^{-1}\ 1,$ |
| | $(1/30)\ x_2\ 1,$ |
| | $(1/4.1)\ x_1 x_2^{-0.5} x_3^{0.5} = 1.$ |

To continue the example, let us consider a closely related problem, with the sign of the constant 1 appearing in the first inequality constraint changed:

| minimize | $x_1 x_3 + x_1 x_2/x_3$ |
| subject to | $x_1 x_2^{-0.3} - 1\ x_3 - x_2^{1.2},$ |
| | $x_2\ 30,$ |
| | $x_1 - 4.1\ \sqrt{x_2/x_3} = 0.$ |

This problem cannot be transformed to a standard form GP, since the right-hand side of the first inequality constraint, in posynomial SGP form, now has two monomial terms. The practical consequence is that the ability to solve the problem globally is lost; only a local minimum can be found.

It is also understood that the Parser can parse signomial and geometric programs having objectives that are either minimized or maximized. In most cases and in the examples provided herein, objectives are minimized. However, a user may request that the Parser maximize the objective, and, therefore, the objective may be maximized by the Parser by finding the minimum of it's inverse. For example, the minimum of objective X can be expressed by the Parser as the maximum of the objective 1/X; and similarly, the maximum of objective Y can be expressed by the parser as the minimum of objective 1/Y.

Ultimately, if block 250 is successful, as determined by block 260, and all lines of source file 115 have been read, as determined by block 270, then the Parser will advance to block 150 of FIG. 1. If the last line has not been read, as determined by block 270, the Parser will repeat the flows of FIGS. 2A and 2B until all the lines of source file 115 have been read and no errors have been encountered. Once the Parser has reached block 150 it is clear that optimization problem inputted in block 120 is in fact a GP. Subsequently, at block 150, the Parser further converts the GP to a CNF, thus converting source file 115 to CNF file 155. CNF file 155 can be inputted to solver 160, as discussed earlier, and solver 160 will attempt to find a global solution to the GP.

If solver 160 calculates a solution to the GP represented by CNF file 155, then it creates solution file 165, containing a numeric solution to the objective and corresponding numeric solutions to the optimization variables. Otherwise, an error will be reported in solution file 165. Solution file 165 is routed back to the Parser where it is translated into a user-readable format (block 170) and expressed in output file 175. An example of output file 175 is shown in Example 3 which displays the global minimum solution to the objective function and the corresponding values of the optimization variables ($x_1$, $x_2$ and $x_3$), as declared in source file 115.

Example 3 problem=GP status=optimal obj_value=1606.14 x1=29.999680001707 x2=37.433796562618 x3=0.69919504957707

Alternate Embodiment of the Invention

Figure 3:
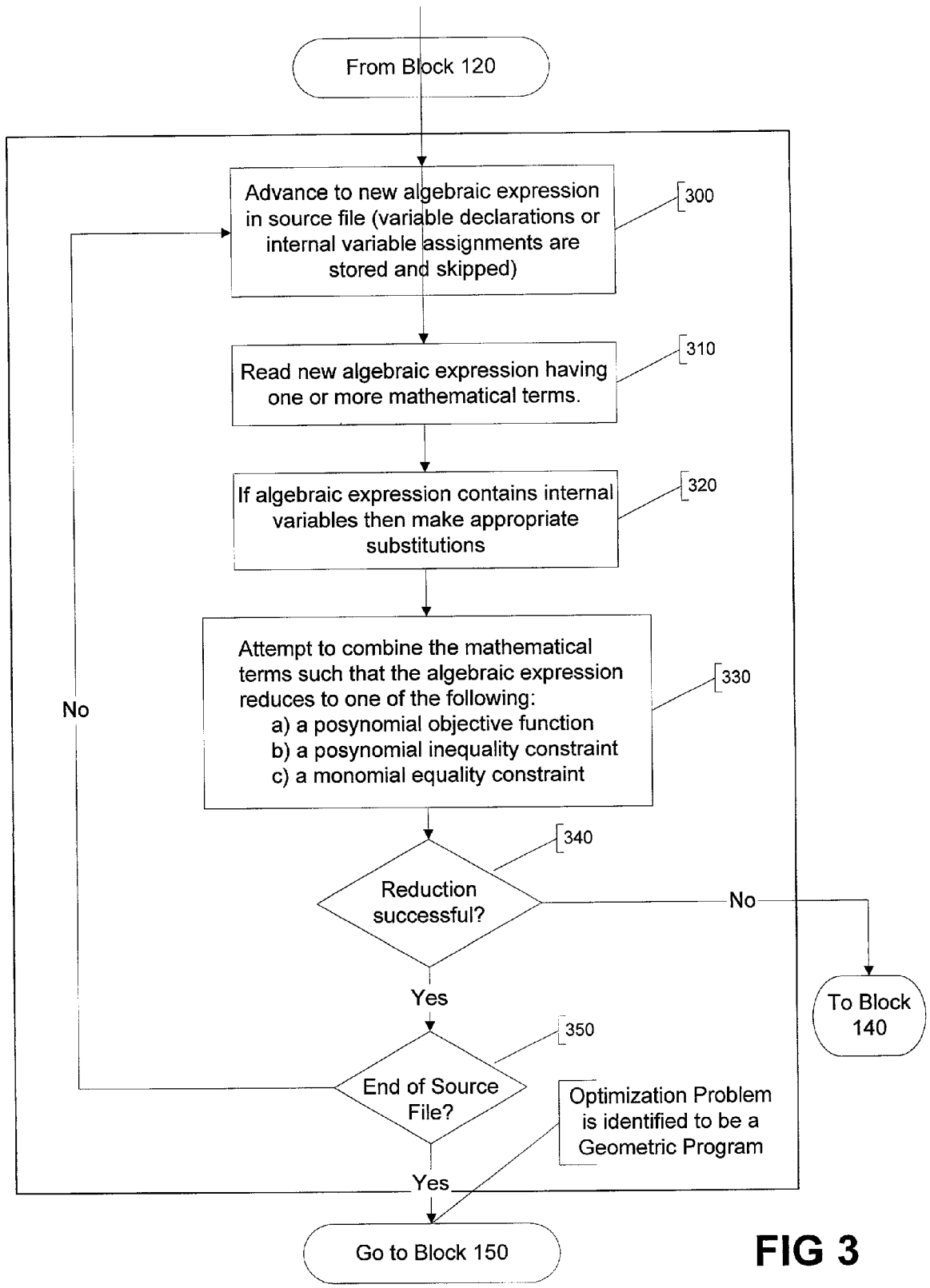
FIG. 3 is a flow diagram showing a more detailed look at the operations performed in block 130 of FIG. 1 for an alternate embodiment of the invention.

One embodiment of the invention exists which implements the identical blocks shown in FIG. 1 with the exception of block 130. FIG. 3 shows a more detailed look at the operations included in block 130 for an alternate embodiment. From block 120 the Parser begins processing source file 115 to locate algebraic expressions, as shown is block 300. If a line contains a variable declaration, then the Parser stores the variables into memory, or if a line contains an internal variable assignment, then GBLAB stores the internal variable and its assigned expression into memory. From block 300 the Parser will read a new algebraic expression at block 310. At block 320 the Parser recognizes, in the algebraic expression, any internal variables representing a previously assigned expression and, if necessary, makes one or more substitutions. The Parser will then advance to block 330 where it attempts to combine the mathematical terms such that the algebraic expression reduces to one of the following: 1) a posynomial objective, 2) a posynomial inequality, or 3) a monomial equality. Specifically, a posynomial inequality shall be a posynomial function being less than or equal to one, and a monomial equality shall be monomial function being equal to one.

Combining the mathematical terms at block 330 shall first involve the Parser identifying each mathematical term as a signomial, posynomial or monomial. Then the Parser will determine if the operators and functions that relate the mathematical terms allow the algebraic expression to be reduced as described above. This process is more intensive than that of the preferred embodiment because the mathematical terms are not all treated as signomials. Rather, the mathematical terms are treated as separate classes of terms (e.g., posynomials and monomials); therefore, the set of mathematical rules that apply to combining the terms and reducing the algebraic expression is more expansive. Moreover, when compared to the embodiment described with reference to FIGS. 2A-B, the cancellation of mathematical terms will not be as obvious to the Parser since the terms are not all treated as signomials.

Ultimately, if block 330 is successful, as determined by block 340, and all lines of source file 115 have been read, as determined by block 350, then the Parser will advance to block 150 of FIG. 1. If the last line has not been processed, as determined by block 350, the Parser will repeat the blocks of FIG. 3 until all the lines of source file 115 have been processed and no errors have been encountered. Once block 150 is reached, the Parser will proceed through the final blocks of FIG. 1 in a manner identical to that of the embodiment of FIGS. 2A-B. Once the Parser has reached block 150 it is clear that optimization problem inputted in block 120 is in fact a GP.

Otherwise, if block 330 is unsuccessful then an error message will be reported to user 110, indicating the type of error and at which line of source file 115 the error occurred. Types of errors include but are not limited to syntax and mathematical infeasibility. It will be understood that errors may be immediately reported to user 110, or the Parser can wait until all the lines of source file 115 are read and report the total number of errors found and their locations in the 115. If an error message is reported then user 110 may make corrections and re-execute the Parser program.

Alternatively, the Parser may report the error stating that the optimization problem cannot be reduced to a GP in standard form, but that it still meets the mathematical criteria of a SGP. In this case user 110 will have the option to successfully re-execute the Parser program in order to create CNF file 175 and have an external SGP solver attempt to find a local solution. However, it would be advantageous for user 110 to modify source file 115 such that the optimization problem may be reduced and parsed as a GP instead of SGP. This modification will provide a GP solver the opportunity to find a global solution to the optimization problem.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer-implemented method of parsing a mathematical optimization problem comprising:

reading from a source file a plurality of algebraic expressions that represent a mathematical optimization problem, each algebraic expression in said plurality having one or more mathematical terms;

creating a set of signomial expressions by converting each of said mathematical terms to a signomial, at least one of said signomial expressions having a constraint with a negative coefficient value and an optimization variable with an exponent value that is real and not one; and converting said set of signomial expressions to a compact numeric format to be accepted by a computer-aided signomial program problem solver and storing said compacted expressions onto a machine readable medium so as to be available for use by said computer-aided signomial program problem solver.

2. The method of claim 1, wherein said algebraic expressions include an objective and a set of one or more constraints.

3. The method in claim 2, wherein:

said objective includes an expression of one or more mathematical terms; and each constraint in said set includes either an inequality or equality of one or more mathematical terms.

4. The method in claim 3, wherein:

each mathematical term includes one or more optimization variables.

5. The method of claim 1, further comprising:

prior to said converting, determining that all signomial expressions in said set reduce to either a posynomial objective, a posynomial inequality or a monomial inequality;

after said determining, identifying that said mathematical optimization problem is a geometric program.

6. The method of claim 1, further comprising:

prior to said converting, determining that at least one of said signomial expressions in said set cannot be reduced to either a posynomial objective, a posynomial inequality or a monomial inequality;

after said determining, reporting to a user which of said signomial expressions in said set cannot be reduced to either a posynomial objective, a posynomial inequality or a monomial inequality.

7. The method of claim 6, further comprising the step of:

simplifying each signomial expression in said set by mathematically canceling a combination of a plurality of said signomials.

8. A computer implemented method, comprising:

preparing input expressions for a geometric program problem solver by executing the following in software:

reading from a source file a plurality of algebraic expressions that represent a geometric program;

converting the plurality of algebraic expressions that represent the geometric program and storing a result of said converting onto a machine readable medium so as to be available for use by said geometric program problem solver, said converting Including for an algebraic expression of said plurality of algebraic expressions:

a) converting said algebraic expression into a signomial expression by converting terms of said signomial expression into a signomial function, said signomial expression having a constraint with a negative coefficient value and an optimization variable with an exponent value that is real and not one;

b) reducing said signomial expression to one of the following:

1) a posynomial objective;
2) a posynomial inequality;
3) a monomial equality.

9. The method of claim 8 wherein said method further comprises making a substitution if said algebraic expression contains an internal variable that represents a previously assigned expression.

10. The method of claim 8 further comprising simplifying the signomial expression by canceling two identical signomial functions of opposite sign.

11. The method of claim 8 further comprising finding said algebraic expressions within lines of an input source file.

12. The method of claim 8 wherein said algebraic expression is one of the following;

1) an objective function;
2) an equality constraint;
3) an inequality constraint.

13. The method of claim 8 wherein said geometric program is a signomial program.

14. Program code embedded on a readable medium which when executed by a computer causes a method to be performed, said method comprising:

preparing input expressions for a geometric program problem solver by executing the following in software:

reading from a source file a plurality of algebraic expressions that represent a geometric program; and converting the plurality of algebraic expressions that represent the geometric program and storing a result of said converting onto a machine readable medium so as to be available for use by said geometric program problem solver, said converting comprising for an algebraic expression of said plurality of algebraic expressions:

a) converting said algebraic expression into a signomial expression by converting terms of said signomial expression into a signomial function, said signomial expression having a constraint with a negative coefficient value and an optimization variable with an exponent value that is real and not one;

b) reducing said signomial expression to one of the following:

1) a posynomial objective;
2) a posynomial inequality;
3) a monomial equality.

15. The method of claim 14 wherein said method further comprises making a substitution if said algebraic expression contains an internal variable that represents a previously assigned expression.

16. The method of claim 14 further comprising simplifying the signomial expression by canceling two identical signomial functions of opposite sign.

17. The method of claim 14 further comprising finding said algebraic expressions within lines of an input source file.

18. The method of claim 14 wherein said algebraic expression is one of the following:

1) an objective function;
2) an equality constraint;
3) an inequality constraint.

19. The method of claim 14 wherein said geometric program is a signomial program.

* * * * *